US011900347B2

(12) United States Patent
York et al.

(10) Patent No.: US 11,900,347 B2
(45) Date of Patent: Feb. 13, 2024

(54) COMPUTING SYSTEM FOR CONFIGURABLE OFF-CHAIN STORAGE FOR BLOCKCHAINS (71) Applicant: Hyland Software, Inc., Westlake, OH (US)

(72) Inventors: Scott York, Cheshunt (GB); Scott Caesar, Lakewood, OH (US); Sam Babic, Melbourne Beach, FL (US)

(73) Assignee: Hyland Software, Inc.

( * ) Notice: Subject to any disclaimer, the term of this patent is extended or adjusted under 35 U.S.C. 154(b) by 718 days.

(21) Appl. No.: 16/832,397

(22) Filed: Mar. 27, 2020

(65) Prior Publication Data

US 2021/0304157 A1 Sep. 30, 2021

(51) Int. Cl.
*G06Q 20/12* (2012.01)
*G06F 21/62* (2013.01)
*G06Q 20/06* (2012.01)
*H04L 9/06* (2006.01)
*H04L 9/08* (2006.01)

(52) U.S. Cl.
CPC ..... *G06Q 20/1235* (2013.01); *G06F 21/6209* (2013.01); *G06Q 20/065* (2013.01); *H04L 9/0643* (2013.01); *H04L 9/0861* (2013.01)

(58) Field of Classification Search
CPC ...... G06Q 20/00–425; G06F 21/00–88; H04L 9/00–50
See application file for complete search history.

(56) References Cited

U.S. PATENT DOCUMENTS

| 10,402,376 B2* | 9/2019 | Luthra | G06F 16/188 |
|---|---|---|---|
| 2016/0344561 A1* | 11/2016 | Grajek | H04L 63/06 |
| 2018/0039648 A1* | 2/2018 | Han | G06F 16/219 |
| 2018/0341648 A1* | 11/2018 | Kakavand | G06F 16/00 |

(Continued)

FOREIGN PATENT DOCUMENTS

| WO | 2017132641 A1 | 8/2017 |
|---|---|---|
| WO | 2021194692 A1 | 9/2021 |

OTHER PUBLICATIONS

Nakamoto Bitcoin A Peer-to-Peer Electronic Cash System (Year: 2018).*

(Continued)

*Primary Examiner* — Mohammad A. Nilforoush
(74) *Attorney, Agent, or Firm* — Eschweiler & Potashnik, LLC (57) ABSTRACT A server computing device receives a first transaction request comprising computer-readable content and metadata for the content. The server computing device generates a first hash based upon the metadata. The server computing device then generates a second hash based upon the first hash and a content identifier that has been generated for the content. The server computing device causes a block to be added to a blockchain, the block comprising the second hash, wherein a transaction identifier is produced as a result of the addition of the block. The server computing device receives, from a second computing device, a second transaction request that comprises an identifier for the computer-readable content. The server computing device provides the second computing device with access to the content based upon the identifier for the content, the block in the blockchain, and the transaction identifier.

20 Claims, 8 Drawing Sheets

(56) References Cited

U.S. PATENT DOCUMENTS

| | | | |
|---|---|---|---|
| 2019/0013932 A1 | 1/2019 | Maino et al. | |
| 2019/0013934 A1 | 1/2019 | Mercuri et al. | |
| 2019/0057382 A1 | 2/2019 | Wright et al. | |
| 2019/0294817 A1* | 9/2019 | Hennebert | H04L 9/0861 |
| 2019/0356493 A1 | 11/2019 | Fisher et al. | |
| 2020/0358612 A1* | 11/2020 | Vigneron | H04L 9/3239 |
| 2020/0382310 A1* | 12/2020 | Jayachandran | G06N 20/00 |

OTHER PUBLICATIONS

Fu Meta-Key A Secure Data-Sharing Protocol under Blockchain-Based Decentralised Storage Architecture (Year: 2017).*
Menezes HandBook of Applied Cryptography (Year: 1997).*
Hash Functions _ CSRC (Year: 2023).*
Hashing—Glossary _ CSRC (Year: 2023).*
Ensuring Data Integrity with Hash Codes _ Microsoft Learn (Year: 2023).*
Patent Cooperation Treaty, "International Search Report and Written Opinion for PCT Patent Application No. PCT/US2021/020061", dated Jun. 10, 2021, 7 pages.
IBM, "Why New Off-Chain Storage is Required for Blockchains", IBM Storage, Document Version 4.1, 13 pages.
Greenspan, Gideon, "Scaling Blockchains with Off-Chain Data", In MultiChain, Private Blockchains, Jun. 13, 2018, Date Retrieved: Mar. 27, 2020, Retrieved at: «https://www.multichain.com/blog/2018/06/scaling-blockchains-off-chain-data/», 12 pages.
Storj Labs, "Decentralized Cloud Storage is Here", Retrieved Date: Mar. 27, 2020, Retrieved Date: «https://storj.io/», 5 pages.
European Search Report dated Oct. 9, 2023 in connection with European Application No. 21776372.1.

* cited by examiner

COMPUTING SYSTEM FOR CONFIGURABLE OFF-CHAIN STORAGE FOR BLOCKCHAINS

FIELD

This disclosure relates to off-chain storage for blockchains.

BACKGROUND

Blockchain (sometimes referred to as block chain) technology refers to a continually expanding list of computer-readable records (referred to as blocks) that are linked using various cryptographic methods. Each block in a blockchain comprises a cryptographic hash of a previous block in the blockchain, a timestamp, and transactional data. The blockchain is utilized by computing devices of a group of related users, sometimes referred to as a consortium. Each computing device of each user has a copy of the blockchain. A block in the blockchain cannot be altered without altering each subsequent block, which requires a consensus among the computing devices of the users. Altering each subsequent block requires a significant amount of computing power, and thus, the blockchain provides for a decentralized, distributed way for users to verify and audit transactions independently. Blockchain technologies have applications in a variety of fields including cryptocurrencies and smart contracts.

As each computing device in the consortium maintains a complete copy of the blockchain and each transaction is recorded in a new block of the blockchain, the computer-storage requirements for storing the blockchain can become large over time. Furthermore, due to limited computer-storage capacity, it is not practical to store certain types of data (e.g., images, documents, audio) in the blockchain itself. As a result, certain data may be referenced in the blockchain, but may be stored separately from the blockchain itself (referred to as "off-chain content").

Conventional approaches for storing off-chain content suffer from various deficiencies. First, conventional approaches tend to rely upon tight coupling between a blockchain maintained in a blockchain network and a storage format of the off-chain storage. Second, conventional approaches tend not to scale well to large numbers of users belonging to many different enterprises. Third, conventional approaches tend not to allow access to off-chain content to users that are not members of the blockchain network. Fourth, conventional approaches do not integrate well into existing enterprise platforms.

SUMMARY

The following is a brief summary of subject matter that is described in greater detail herein. This summary is not intended to be limiting as to the scope of the claims.

A server computing device receives a first transaction request from a first computing device of a first enterprise, the first transaction request comprising computer-readable content and metadata for the computer-readable content. Responsive to receiving the first transaction request, the server computing device generates a first hash based upon the metadata for the computer-readable content. Responsive to storing the computer-readable content and the metadata for the computer-readable content in a data store, the server computing device generates a content identifier for the computer-readable content. The server computing device generates a second hash based upon the first hash and the content identifier. The server computing device causes a block to be added to a blockchain maintained by a plurality of computing devices in a blockchain network, the block comprising the second hash, wherein the plurality of computing devices achieves a consensus with respect to addition of the block to the blockchain, wherein achievement of the consensus causes a transaction identifier for the block to be generated. The server computing device stores the transaction identifier in the data store in association with the computer-readable content and the metadata. Responsive to receiving a second transaction request comprising an identifier for the computer-readable content from a second computing device, the server computing device provides the second computing device with access to the computer-readable content based upon the identifier for the computer-readable content, the block in the blockchain, and the transaction identifier.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to off-chain storage for blockchains are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "application", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference. Additionally, as used herein, the term "off-chain content" refers to computer-readable content that is referenced in a blockchain, but is stored separately from the blockchain itself.

Described herein are various technologies pertaining to off-chain blockchain storage. The technologies described herein permit computer-readable content such as document content, audio content, and video content to be shared among and across different enterprises via a blockchain, without requiring the enterprises to open their respective networks to one another. The technologies described herein also enable a trusted record of creation, access, and modification of the computer-readable content to be generated (via the blockchain). Unlike conventional approaches for off-chain content storage, the technologies described herein provide for loose coupling between the blockchain and the storage format of the off-chain content. Furthermore, in comparison to conventional technologies, the technologies described herein provide for a more granular set of access permission rules, while still taking full advantage of functionality provided by the blockchain. Additionally, the technologies described herein can be fully cloud-hosted such that individual users do not need to manually install software and can access computer-readable content referenced in a blockchain from any device.

Figure 1:
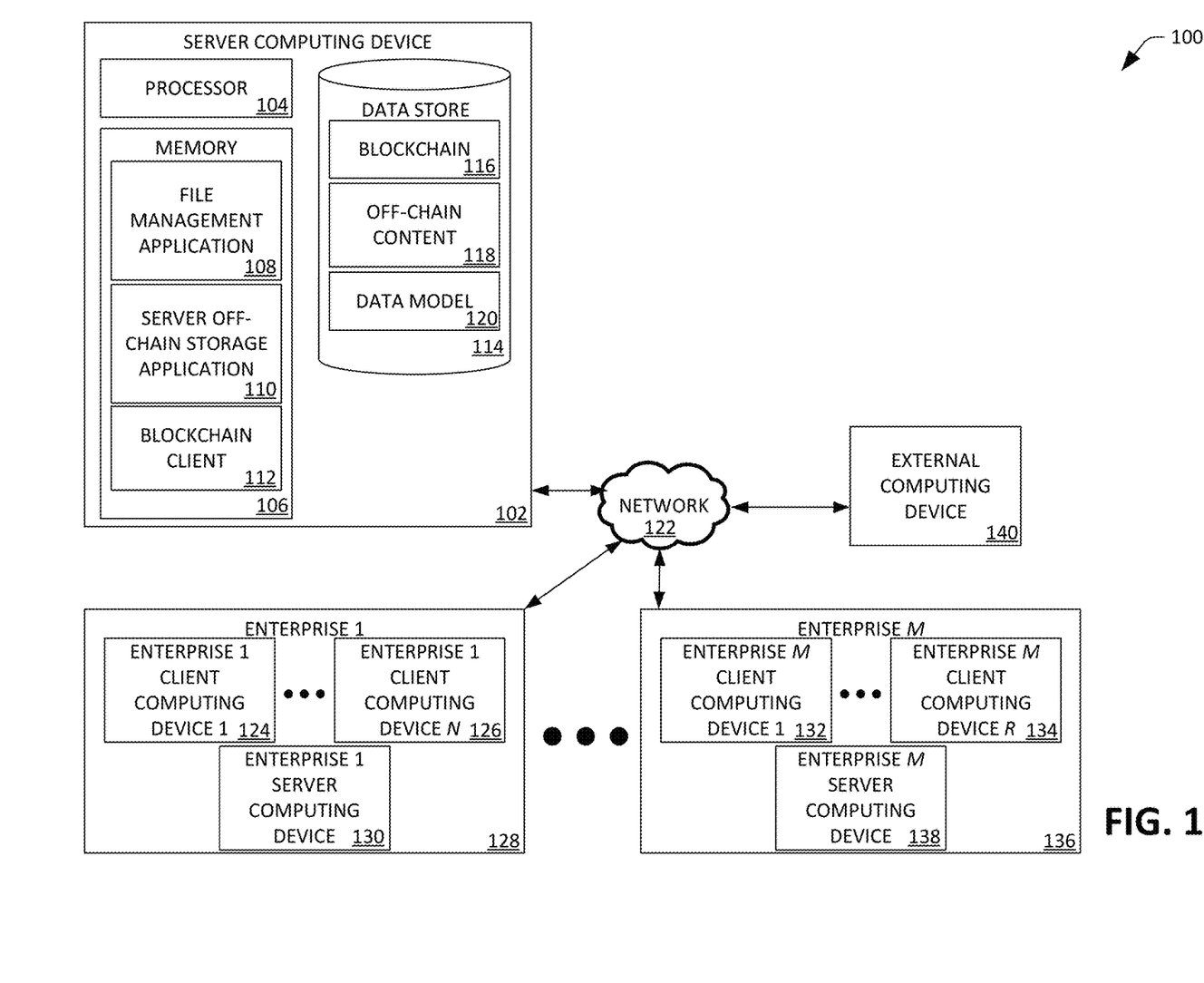
FIG. 1 is a functional block diagram of an exemplary computing system that facilitates off-chain storage for blockchains.

With reference to FIG. 1, an exemplary computing system 100 that facilitates off-chain content storage for blockchains is illustrated. The computing system 100 includes a server computing device 102. In an embodiment, the server computing device 102 may be a cloud-based computing platform. In another embodiment, the server computing device 102 may be or include enterprise content management (ECM) system.

The server computing device 102 comprises a processor 104 and memory 106, wherein the memory 106 has a file management application 108, a server off-chain storage application 110, and an instance of a blockchain client 112 loaded therein. The enterprise file management application 108, when executed by the processor 104, is configured to encrypt, store, and provide access to computer-readable content (for instance, off-chain content for blockchains).

The server off-chain storage application 110, when executed by the processor 104, is configured to facilitate sharing of computer-readable content referenced in blockchains (and stored in off-chain storage) across multiple different enterprises and/or end-users. The server off-chain storage application 110 provides a configuration engine that enables computing devices of a plurality of enterprises (e.g., healthcare enterprises, government entities, insurance companies) to be configured to access off-chain content maintained by the server computing device 102. The server off-chain storage application 110 may provide workflow modeling functionality that enables users to integrate aspects of off-chain storage into workflows of the respective enterprises of the users. The off-chain storage application 110 also provides software as a service (SaaS) functionality that enables integration between the server computing device 102 and the computing devices of the plurality of enterprises. In an embodiment, the server off-chain storage application 110 provides an application programming interface (API) that enables viewing, adding, and modifying off-chain content referenced in blockchains.

The blockchain client 112, when executed by the processor 104, is configured to add to, access, and/or modify data stored on a blockchain. When a computing device executes the blockchain client 112, the computing device is considered to be a member of a blockchain network. The blockchain client 112 may be considered a node on a blockchain network. In an embodiment, the blockchain client 112 may serve as a client node, a peer node, and/or an orderer node. When serving as a client node, the blockchain client 112 enables a user to submit a transaction to members of the blockchain network. For instance, the transaction may be a request to view data on the blockchain or a request to add data to the blockchain. When serving as a peer node, the blockchain client 112 commits the transactions to the blockchain. When serving as an orderer node, the blockchain client 112 facilitates communication between client nodes and peer nodes and also packages transactions into blocks that are to be added to the blockchain by peer nodes. In an embodiment, the blockchain client 112 may be executed in a web browser.

The server computing device 102 further comprises a data store 114. The data store 114 comprises an instance of a blockchain 116, off-chain content 118, and a data model 120. In an embodiment, the blockchain 116 may be a private blockchain that can only be accessed by trusted entities. In another embodiment, the blockchain 116 may be a public blockchain. In yet another embodiment, a distributed, public ledger may be used in place of the blockchain 116.

Figure 2:
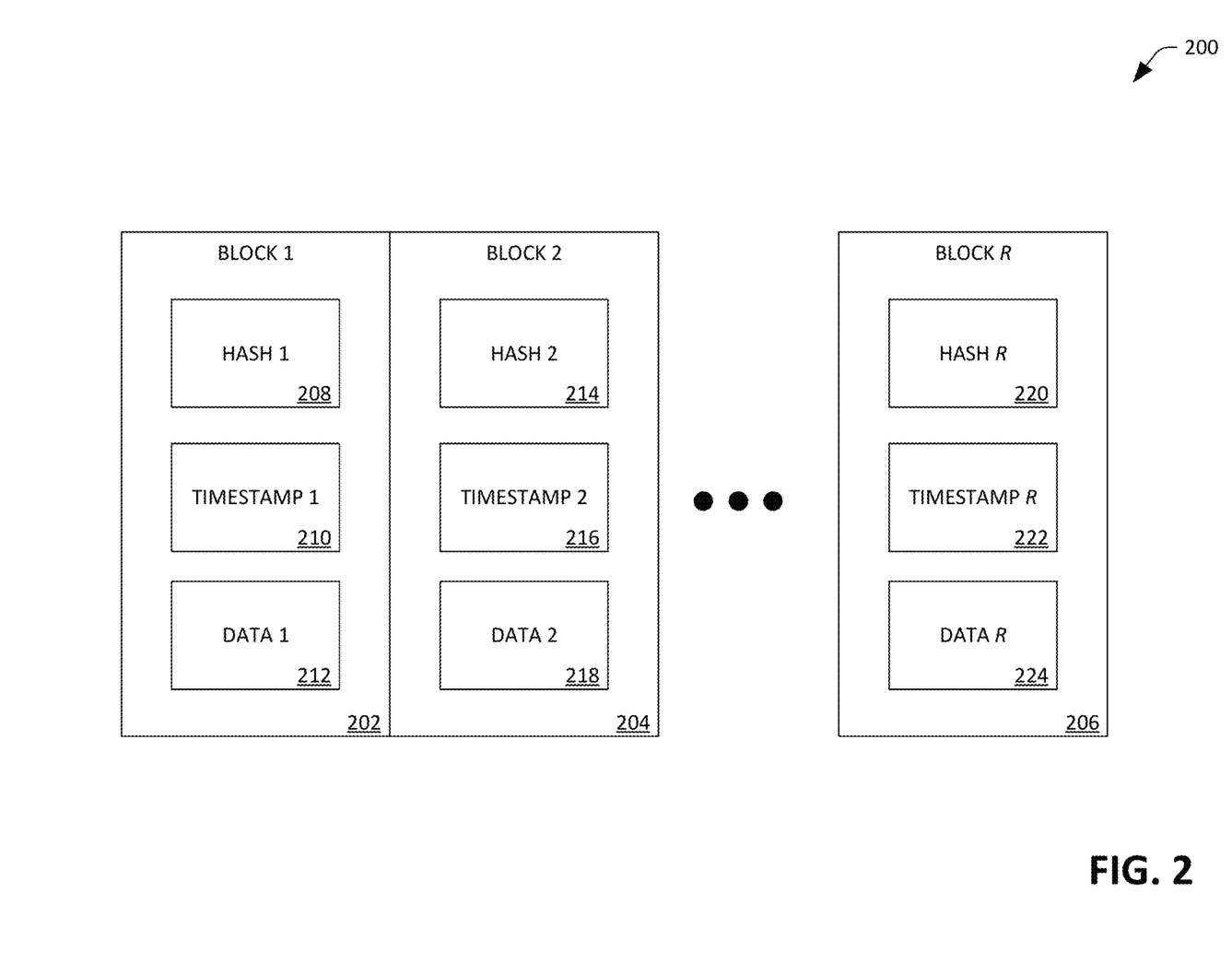
FIG. 2 is a functional block diagram of an exemplary blockchain.

Referring briefly now to FIG. 2, an exemplary blockchain 200 is illustrated. In an example, the blockchain 200 may be or include the blockchain 116 and the blockchain 116 may be or include the blockchain 200. The blockchain 200 comprises a plurality of blocks 202-206. For instance, the plurality of blocks 202-206 may include a first block 202, a second block 204, and a Rth block 206, where R is a positive integer greater than 2. Each block in the plurality of blocks 202-206 comprises a cryptographic hash of the previous block in the blockchain 200, a timestamp when each block was created, and data. For instance, the first block 202 comprises a first hash 208, wherein the first hash 208 is a hash of the previous block in the blockchain 200 (not shown in FIG. 2), a first timestamp 210 when the first block 202 was created, and first data 212. In an example, the first data 212 may be a hash of metadata for computer-readable content and/or a share token for the computer-readable content. More specifically, the metadata may be indicative of off-chain content stored separately from the blockchain 200. The second block 204 comprises a second hash 214 (wherein the second hash 214 is a hash of the previous block in the blockchain 200—the first block 202), a second timestamp 216 when the second block 204 was created, and second data 218. In an example, the second data 218 may be indicative of a member of the blockchain network accessing (i.e. viewing) the computer-readable content that is referenced in the first block 202 via the hash of the metadata. The Rth block 206 comprises a Rth hash 220, wherein the Rth hash 220 is a hash of the previous block in the blockchain 200 (which may be the second block 204 or another block in the blockchain 200 not shown in FIG. 2), a Rth timestamp 222 when the Rth block 206 was created, and Rth data 224. In an example, the Rth data 224 may be indicative of a modification of the computer-readable content referenced in the first block 202 via the hash of the metadata.

Referring back to FIG. 1, the data store 114 further comprises off-chain content 118. The off-chain content 118 comprises computer-readable content that is referenced in, but not directly stored on, the blockchain 116. The off-chain content 118 may also comprise metadata for the computer-readable content. A hashed version of the metadata for the off-chain content 118 is stored on the blockchain 116, the metadata referencing the off-chain content 118. In an example, the off-chain content 118 may be a document (e.g., a portable document format (PDF) document, a word document), video content, audio content, or image content. In a more specific example, the off-chain content 118 may be clinical data for patients. In an embodiment, the off-chain content 118 may be encrypted and decrypted via a key produced via a blockchain network. The data store 114 further comprises a data model 120 that enables the off-chain content to be formatted in compliance with various regulatory schemes The computing system 100 further comprises a first client computing device$_{1,1}$ 124 of a first enterprise 128 and an Nth client computing device$_{1,N}$ 126 of the first enterprise 128, where the first subscript referenced above refers to the enterprise to which the client computing device belongs and the second subscript referenced above refers to the number of the client computing device within the enterprise, and where N is a positive integer greater than one (collectively referred to herein as "the first plurality of client computing devices 124-126"). The first plurality of client computing devices 124-126 is in communication with the server computing device 102 by way of a network 122 (e.g., the Internet, intranet). Some or all of the first plurality of client computing devices 124-126 execute an instance of the blockchain client 112 and maintain an instance of the blockchain 116, and hence some or all of the first plurality of client computing devices 124-126 are members of a blockchain network that maintains the blockchain 116. The first plurality of client computing devices 124-126 belong to (i.e., are under the control of) the first enterprise 128. In an example, the first enterprise 128 may be a first healthcare organization, a first government agency, or a first insurance provider.

The computing system 100 also comprises a first client computing device$_{M,1}$ of a Mth enterprise 136 and a Rth client computing device$_{M,R}$ 134 of the Mth enterprise 136 (collectively referred to herein as "the second plurality of client computing devices 132-134"), where M and R are positive integers greater than one. The second plurality of client computing devices 132-134 are in communication with the server computing device 102 by way of the network 122. Some or all of the second plurality of client computing devices 132-134 execute an instance of the blockchain client 112 and maintain an instance of the blockchain 116, and hence some or all of the second plurality of client computing devices 132-134 are members of the blockchain network that maintains the blockchain 116. The second plurality of client computing devices 132-134 belong to (i.e., are under the control of) the Mth enterprise 136. In an example, the Mth enterprise 136 may be a second healthcare organization, a second government agency, or a second insurance provider.

Figure 3:
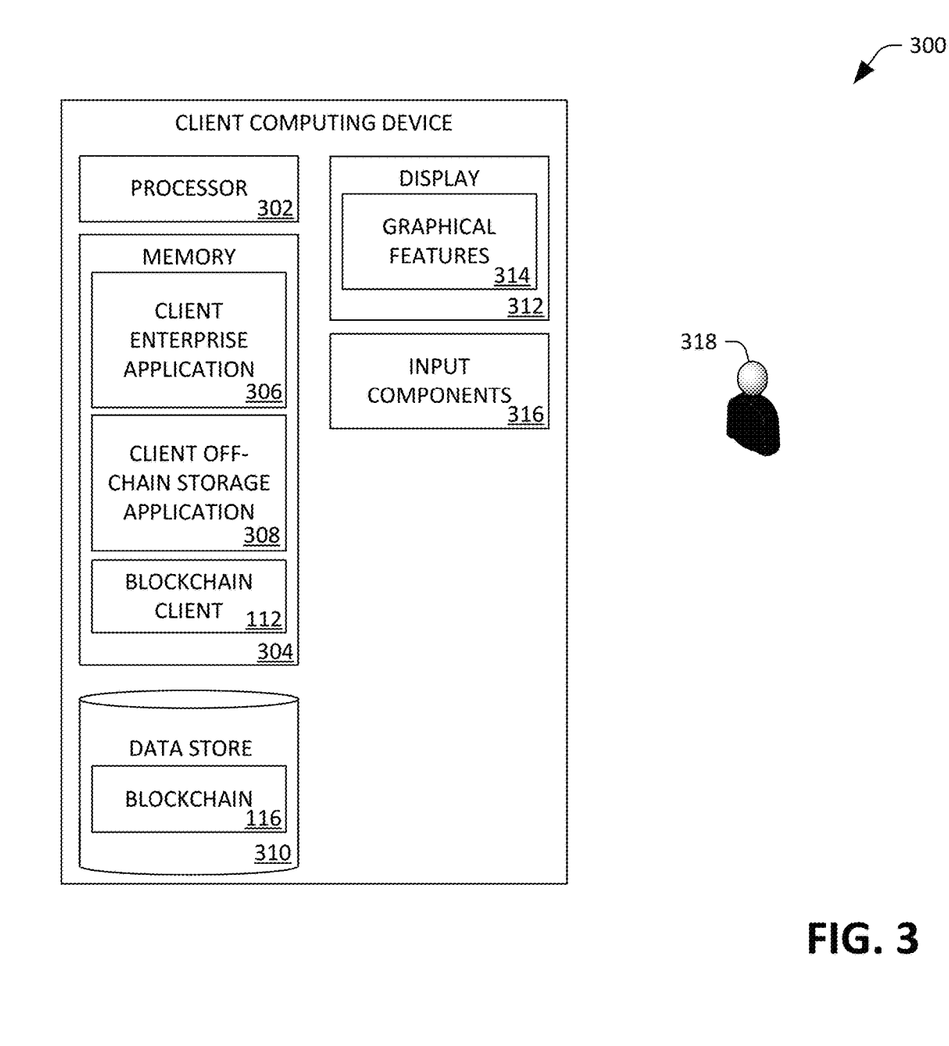
FIG. 3 is a functional block diagram of an exemplary client computing device.

Referring briefly now to FIG. 3, an exemplary client computing device 300 is illustrated. The client computing device 300 may be a client computing device in the first plurality of client computing devices 124-126 or a client computing device in the second plurality of client computing device 132-134. In an example, the client computing device 300 may be the first client computing device$_{1,1}$ 124 of the first enterprise 128. In another example, the client computing device 300 may be the first client computing device$_{M,1}$ 132 of the Mth enterprise 136. The client computing device 300 is operated by a user 318 that belongs to an enterprise (e.g., the first enterprise 128, the Mth enterprise 136).

The client computing device 300 comprises a processor 302 and memory 304, wherein the memory 304 has a client enterprise application 306 loaded therein. The client enterprise application 306, when executed by the processor 302, is an application utilized by an enterprise that provides functionality in accordance with a purpose of the enterprise. In an example, the enterprise may be a healthcare organization, and as such the client enterprise application 306 may be a client electronic health records (EHR) application that is configured to perform tasks related to patient care in a healthcare facility. The memory 304 additionally includes a client off-chain storage application 308 loaded therein that is executed by the processor 302. In an embodiment, the client computing device 300 may execute the client off-chain storage application 308 in a web browser. The client off-chain storage application 308 may execute in basic mode or in administrator mode. When executing in basic mode, the client off-chain storage application 308 is configured to provide an interface for the user 318 to add, view, and/or modify off-chain content that is referenced on the blockchain 116. When executing in administrator mode, the client off-chain storage application 308 is configured to provide an interface that enables the user 318 to setup a blockchain network that will maintain the blockchain 116, modify an existing blockchain network, grant access permissions to different users of the blockchain network, and so forth. In an embodiment, the client off-chain storage application 308 may be integrated directly into the client enterprise application 306. In an embodiment, the client off-chain storage application 308 may be a web application that executes in a web browser on the client computing device 300. The memory 304 also has an instance of the blockchain client 112 loaded therein (described above).

The client computing device 300 additionally comprises a data store 310 that stores an instance of the blockchain 116 described above. The client computing device 300 may further comprise a display 312, whereupon graphical features 314 may be presented thereon. For instance, a graphical user interface (GUI) for the client enterprise application 306, the blockchain client 112, and/or the client off-chain storage application 308 may be presented on the display 312 as part of the graphical features 314. In an embodiment, the display 312 may be a touchscreen. The client computing device 300 may further include input components 316 that enable the user 318 to set forth input to the client computing device 300. In an example, the input components 316 may include a mouse, a keyboard, a trackpad, a scroll wheel, a microphone, a camera, a video camera, and/or a touchscreen.

Referring back to FIG. 1, the computing system 100 may also include a first enterprise server computing device 130 and a Mth enterprise server computing device 138, wherein M is the positive integer greater than 1. The first enterprise server computing device 130 and the Mth enterprise server computing device 138 are under control of the first enterprise 128 and the Mth enterprise 136, respectively.

Figure 4:
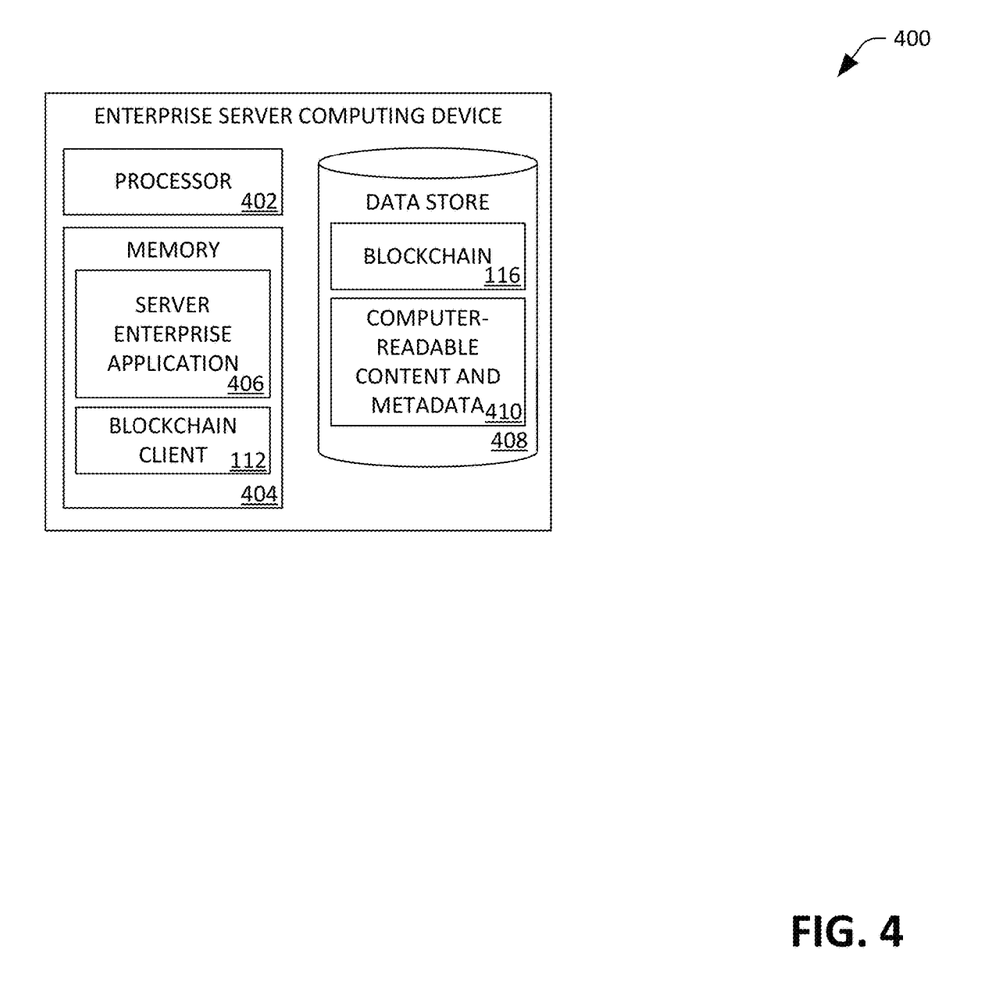
FIG. 4 is a functional block diagram of an exemplary enterprise server computing device.

Turning now to FIG. 4, an exemplary enterprise server computing device 400 is illustrated. In an example, the enterprise server computing device 400 may be or include the first enterprise server computing device 130 or the Mth enterprise server computing device 138. When the enterprise server computing device 400 is the first enterprise server computing device 130, the enterprise server computing device 400 may be in communication with the server computing device 102 and the first plurality of client computing device 124-126 via the network 122 (or other networks). When the enterprise server computing device 400 is the Mth enterprise server computing device 138, the enterprise server computing device 400 136 may be in communication with the server computing device 102 and the second plurality of client computing device 132-134 via the network 122 (or other networks).

The enterprise server computing device 400 comprises a processor 402 and memory 404, wherein the memory 404 has a server enterprise application 406 loaded therein. The server enterprise application 406, when executed by the processor 402, is configured to provide functionality in accordance with a purpose of the enterprise to which the enterprise server computing device 400 belongs. In an example, the enterprise may be a healthcare organization, and as such the server enterprise application 406 may be a server EHR application that is configured to perform tasks related to patient care in a healthcare facility, such as patient record creation and maintenance, prescription generation, etc. The memory 404 may additionally have an instance of the blockchain client 112 loaded therein (described above). The enterprise server computing device 400 further includes a data store 408. The data store 408 comprises an instance of the blockchain 116 (described above). The data store 408 may also comprise computer-readable content and metadata 410, wherein the computer-readable content and metadata 410 are a local copy of the off-chain content 118 described above.

Turning briefly now to FIG. 1, the computing system 100 may also include an external computing device 140 that does not belong to an enterprise and/or is not a member of the blockchain network. For instance, the external computing device 140 may be operated by an end-user to which the first enterprise 128 and/or the Mth enterprise 136 provides services thereto. As will be described in greater detail below, the server off-chain storage application 110 may be configured to share the off-chain content 118 referenced in the blockchain 116 with the external computing device 140.

Referring generally now to FIGS. 1-5, operation of the computing system 100 is now set forth. The computing system 100 registers a blockchain network. More specifically, while the client off-chain storage application 308 is executing in administrator mode, the client computing device 300 receives configuration data as input from the user 318. For instance, the configuration data may comprise parameters of the blockchain 116 that is to be generated, such as types of off-chain content that are to be referenced on the blockchain 116 (via hashes of metadata of the off-chain content), access permissions for the blockchain 116, settings for processing errors encountered when adding and/or accessing off-chain content, and a consensus protocol that is to be used to achieve a consensus on the blockchain network. For instance, the consensus protocol may be a Proof of Work (PoW) model, a Proof of Stake (PoS) model, a Delegated Proof of State (DPoS) model, a Proof of Authority (PoA) model, a Proof of Weight (PoWeight) model, or a Byzantine Fault Tolerance (BFT) model. The configuration data may also comprise identifiers for computing devices that are to participate in the blockchain network (e.g., identifiers for the first plurality of client computing devices 124-126 and an identifier for a storage location at which the off-chain content 118 is to be stored (e.g., the server computing device 102).

The client computing device 300 then causes the blockchain network to be generated based upon the configuration data. More specifically, the blockchain client 112 generates an instance of the blockchain 116 on the client computing device 300, wherein the blockchain 116 initially comprises a genesis block that serves as a root of the blockchain 116. The client computing device 300 also causes an instance of the blockchain 116 and an instance of the blockchain client 112 to be distributed to each of the computing devices that are to participate in the blockchain network (e.g., the first plurality of client computing devices 124-126), whereupon each of the computing devices load their respective instance of the blockchain client 112 into their respective memories and store their respective instance of the blockchain 116 in their respective data stores.

As noted above, the computing system 100 provides enables disparate enterprises to add to, access, and modify the off-chain content 118 referenced in the blockchain 116. As such, as part of the registration of the blockchain network (or subsequent to generation of the blockchain network), the client computing device 300 can transmit an invite to the second plurality of client computing devices 132-134 of the Mth enterprise 136, whereupon each of the second plurality of client computing devices 132-134 may receive an instance of the blockchain 116 and an instance of the blockchain client 112 from a computing device, for instance, from the server computing device 102. Each of the second plurality of client computing devices 132-134 may then load their respective instance of the blockchain client 112 into their respective memories and store their respective instance of the blockchain 116 in their respective data stores.

Subsequent to registration of the blockchain network, it is contemplated that the user 318 of the client computing device 300 wishes to add off-chain content to the blockchain network, that is, the user wishes to add hashed metadata for the computer-readable content to the blockchain 116, the hashed metadata referencing the computer-readable content. The client computing device 300 receives user credentials for the user 318 as input from the user 318. Responsive to receiving the user credentials, the client computing device 300 transmits the user credentials to the server computing device 102, whereupon the server computing device 102 authenticates the user 318 based upon the user credentials. Responsive to authenticating the user 318, the server computing device 102 generates a token (e.g., an Extensible Markup Language (XML) token) and transmits the token to the client computing device 300. The client computing device 300 may utilize the token to access the blockchain network that maintains the blockchain 116. In an embodiment, the computing system 100 may utilize Representation State Transfer (RESTful) web services in order to facilitate adding and accessing off-chain content to the blockchain network.

The client computing device 300 causes the server computing device 102 to receive a transaction request, the transaction request comprising computer-readable content and metadata for the computer-readable content. The client computing device 300 can receive input from the user 318 that causes the client computing device 300 to create the computer-readable content and the metadata for the computer-readable content. The client computing device 300 may display the computer-readable content and the metadata for the computer-readable content in a viewer (i.e., a GUI) for the client off-chain storage application 308 to reduce ambiguity as to the particular computer-readable content that is to be stored as off-chain content. In an embodiment, the client computing device 300 may present the viewer as a pop-up window to the client enterprise application 306 such that the viewer is overlaid upon a GUI for the client enterprise application 306. In another embodiment, the client computing device 300 may present the viewer in-line with the client enterprise application 306 such that the viewer appears as part of the client enterprise application 306. In an embodiment, the client enterprise application 306 may communicate with the server enterprise application 406 in order to validate the computer-readable content and/or the metadata for the computer-readable content.

The metadata for the computer-readable content includes an identifier for the source system (e.g., the first enterprise 128) to which the computer-readable content belongs, a file type of the computer-readable content, a date of creation of the computer-readable content, and a file size of the computer-readable content. The metadata may also include a date of last access of the computer-readable content and access permissions for the computer-readable content (e.g., identifiers for users and/or enterprises that are to be able to access and/or modify the computer-readable content). It is contemplated that the client off-chain storage application 308, the server off-chain storage application 110, the client enterprise application 306, and/or the server enterprise application 406 automatically generate the metadata for the computer-readable content; however, it is to be understood that the viewer of the client off-chain storage application 308 may enable the user to manually edit the metadata for the computer-readable content.

In a specific example, the computer-readable content may be a birth certificate that includes a name of an individual and a date of birth of the individual. In an embodiment, the client computing device 300 may communicate with the enterprise server computing device 400 in order to validate the computer-readable content and/or the metadata for the computer-readable content. In the previous example where the computer-readable content is a birth certificate, the enterprise server computing device 400 may verify that the date of birth on the birth certificate is a valid date. After validating the computer-readable content, the enterprise server computing device 400 may store a local copy of the computer-readable content and the metadata for the computer-readable content in the data store 408 as part of the computer-readable content 410. The client computing device 300 generates a transaction request comprising the computer-readable content and the metadata for the computer-readable content and transmits the transaction request to the server computing device 102.

The server computing device 102 receives the transaction request from the client computing device 300. Responsive to receiving the transaction request, the server computing device 102 processes the transaction request via the server off-chain storage application 110. Specifically, the server computing device 102 may generate a hash of the computer-readable content by applying a hash function to the computer-readable content (e.g., a Secure Hash Algorithm (SHA)-256 algorithm). The server computing device 102 may then cause the hash of the computer-readable content to be included in the metadata. Alternatively, the client computing device 300 may generate the hash of the computer-readable content and include the hash of the computer-readable content with the metadata that is received by the server computing device 102.

The server computing device 102 then applies the hash function to the metadata (which includes the hash of the computer-readable content) to generate a first hash. The server computing device 102, via the file management application 108, generates a content identifier for the computer-readable content. The server computing device 102 then applies the hash function to the combination of the first hash and the content identifier to generate a second hash. The server computing device 102, via the file management application 108, also generates a share token for the computer-readable content based upon the metadata, which, as noted above, may include access permissions for the computer-readable content. The share token enables the computer-readable content and/or metadata for the computer-readable content to be shared among different computing devices. For instance, the share token may comprise identifiers for users and/or enterprises that to be able to access the computer-readable content. Responsive to processing the transaction request, the server computing device 102, via the file management application 108, stores the computer-readable content and the metadata for the computer-readable content (including the second hash and the content identifier) in the data store 114 as part of the off-chain content 118. In an embodiment, the server computing device 102, via the server off-chain storage application 110, may perform formatting on the metadata for the computer-readable content in order to match requirements of the blockchain network.

Subsequent to storing the computer-readable content and the metadata for the computer-readable content as part of the off-chain content 118, the server computing device 102 then causes a block to be added to the blockchain 116. With more particularity, the server off-chain storage application 110 causes the second hash and the share token to be received by the instance of the blockchain client 112 executing on the server computing device 102. Responsive to receiving the second hash and the share token, the blockchain client 112 processes the second hash and the share token. Specifically, the blockchain client 112 executing on the server computing device 102 causes a consensus to be achieved (via a consensus protocol) on the blockchain network with respect to the addition of the second hash (which itself is indicative of the computer-readable content) to the blockchain 116. Achievement of the consensus on the blockchain network causes a transaction identifier for the block to be generated. In an embodiment, achievement of the consensus on the blockchain network causes a key to be generated. Achievement of the consensus also causes the block to be added to the blockchain 116. The block comprises the second hash, a timestamp, the share token, and a hash of the previous block of the blockchain 116. After the consensus has been achieved, each member of the blockchain network has an instance of the blockchain 116 that includes the block. In an embodiment, the server computing device 102 may apply validation rules (also known as smart contracts) to the metadata for the computer-readable content. In the embodiment, upon successful validation using the validation rules, the block is added to the blockchain 116.

Responsive to the consensus being achieved, the server off-chain storage application 110 receives the transaction identifier (and optionally the key) and provides the transaction identifier (and optionally the key) to the file management application 108. The file management application 108 stores the transaction identifier (and optionally the key) in association with the computer-readable content and the metadata for the computer-readable content stored as part of the off-chain content 118. In an embodiment, the server off-chain storage application 110 may encrypt the computer-readable content and the metadata for the computer-readable content with the key. As an additional validation measure, the server off-chain storage application 110 may retrieve the second hash from the blockchain 116, generate a test hash by applying the hash function to the combination of the first hash and the content identifier (referenced above), and ensure that the second hash from the blockchain 116 matches the test hash. The server off-chain storage application 110 may then mark the computer-readable content as available for access.

Subsequently, it is contemplated that a user of the first client computing device$_{M,1}$ 132 of the Mth enterprise 136 wishes to view the computer-readable content referenced in the block in the blockchain 116. Additionally, it is contemplated that the share token in the block in the blockchain 116 references the user and/or the first enterprise 128 to which the user belongs. The first client computing device$_{M,1}$ 132 may or may not be a member of the blockchain network (that is, the first client computing device$_{M,1}$ 132 may or may not have an instance of the blockchain client 112 installed thereon). The first client computing device$_{M,1}$ 132 receives input from the user that causes a transaction request to be generated, the transaction request including an identifier for the user and an identifier for the computer-readable content. The first client computing device$_{M,1}$ 132 transmits the transaction request to the server computing device 102.

Responsive to receiving the transaction request, the server computing device 102 determines, via the server off-chain storage application 110, that the user is authorized to access the computer-readable content based upon the identifier for the user. More specifically, the server off-chain storage application 110 may maintain a list of authorized users, and the server off-chain storage application 110 may examine the list to determine whether the user is authorized to view the computer-readable content. Responsive to determining that the user is authorized, the server computing device 102, via the file management application 108, retrieves, based upon the identifier for the computer-readable content received from the first client computing device$_{M,1}$ 132 and the (previously generated) content identifier, the computer-readable content and the metadata for the computer-readable content that are stored as part of the off-chain content 118. The server computing device 102, via the server off-chain storage application 110, then generates a test hash of the metadata by applying the hash function to the metadata. The server computing device 102, via the instance of the blockchain client 112, also retrieves the block in the blockchain 116 (that includes the second hash) using the transaction identifier. The server computing device 102 may again determine that the user is authorized to access the computer-readable content based upon the share token included in the block in the blockchain 116.

The server computing device 102, via the server off-chain storage application 110, then performs a comparison between the test hash and the second hash stored in the blockchain 116. When the comparison indicates that the test hash and the second hash are identical, the server computing device 102 may transmit a copy of the computer-readable content (and optionally the metadata) to the first client computing device$_{M,1}$ 132, whereupon the first client computing device$_{M,1}$ 132 may present the copy of the computer-readable content and/or the metadata for the computer-readable content on a display. When the comparison indicates that the test hash and the second hash are not identical, the server computing device 102 may generate an alarm to indicate that expectations of authenticity cannot be met. The server computing device 102 may then transmit the alarm to the first client computing device$_{M,1}$ 132 and/or other computing devices. In an embodiment where the computer-readable content and/or the metadata for the computer-readable content has been encrypted using the key, the server computing device 102 may decrypt (with the key) the computer-readable content and/or the metadata for the computer-readable content prior to transmitting the copy of the computer-readable content and/or the metadata for the computer-readable content to the first client computing device$_{M,1}$ 132. In an embodiment, the server computing device 102 may maintain an access of log, wherein the access log comprises identifiers for users who accessed off-chain content. The server computing device 102 may store the access log in the data store 114. In an embodiment, the access log may be part of the blockchain 116, that is, blocks may be added to the blockchain which indicate which users accessed which blocks in the blockchain 116.

Subsequently, the user of the first client computing device$_{M,1}$ 132 of the Mth enterprise 136 may wish to modify the computer-readable content (e.g., to correct an error). As such, the first client computing device$_{M,1}$ 132 may receive a modification to the computer-readable content as input from the user. The modification to the computer-readable content also causes the metadata to be modified. The first client computing device$_{M,1}$ 132 constructs a transaction request comprising the modified computer-readable content and the modified metadata and transmits the transaction request to the server computing device 102.

Similar to the process described above, the server computing device 102, via the server off-chain storage application 110, processes the transaction request. The server computing device 102, via the serer off-chain storage application 110, applies the hash function to the modified metadata to generate a third hash. The server computing device 102, via the file management application 108, generates a modified content identifier for the modified computer-readable content. The server computing device 102, via the server off-chain storage application 110, applies the hash function to the combination of the third hash and the modified content identifier in order to generate a fourth hash. The server computing device 102, via the file management application 108, also generates a second share token for the modified computer-readable content. Responsive to processing the transaction request, the server computing device 102, via the file management application 108, stores the modified computer-readable content and the modified metadata for the modified computer-readable content (including the fourth hash and the modified content identifier) in the data store 114 as part of the off-chain content 118.

Subsequent to storing the modified computer-readable content and the modified metadata for the modified computer-readable content as part of the off-chain content 118, the server computing device 102 causes a second block to be added to the blockchain 116. The second block comprises the fourth hash, a timestamp, and a hash of a previous block in the blockchain 116. With more particularity, the server off-chain storage application 110 causes the fourth hash and the second share token to be received by the instance of the blockchain client 112 executing on the server computing device 102. Responsive to receiving the fourth hash and the second share token, the blockchain client 112 processes the fourth hash and the second share token. With even more particularity, the blockchain client 112 executing on the server computing device 102 causes a consensus to be achieved (via the consensus protocol) on the blockchain network with respect to the addition of the fourth hash (which itself is indicative of the modified computer-readable content) to the blockchain 116. Achievement of the consensus causes a second transaction identifier to be generated. In an embodiment, achievement of the consensus on the blockchain network causes a second key to be generated (which can be used to encrypt/decrypt the computer-readable content stored as part of the off-chain content 118). Achievement of the consensus also causes the block to be added to the blockchain 116. The block comprises the fourth hash, a second timestamp, the second share token, and a hash of the previous block of the blockchain 116. After the consensus has been achieved, each member of the blockchain network has an instance of the blockchain 116 that includes the second block.

Responsive to the consensus being achieved within the blockchain network, the server computing device 102 stores the second transaction identifier (and optionally, the second key) as part of the off-chain content 118 stored in the data store 114. The server computing device 102 then stores the modified computer-readable content and the second key as part of the off-chain content 118 comprised by the data store 114. In an embodiment, prior to storing the modified computer-readable content as part of the off-chain content 118, the server computing device 102 may encrypt the modified computer-readable content using the second key.

Although the above-described process has been described as storing the off-chain content 118 in a central location (i.e., the data store 114), other possibilities are contemplated. For instance, in an embodiment, the server computing device 102 may cause a plurality of copies of the computer-readable content to be generated and stored in data stores of a plurality of computing devices (e.g., the off-chain content 118 may be stored in a data store of the first enterprise server computing device 130 and in a data store of the Mth enterprise server computing device 138). In an embodiment, the computer-readable content may be accessed and/or modified by the external computing device 140 in a manner similar to that described above.

Figure 5:
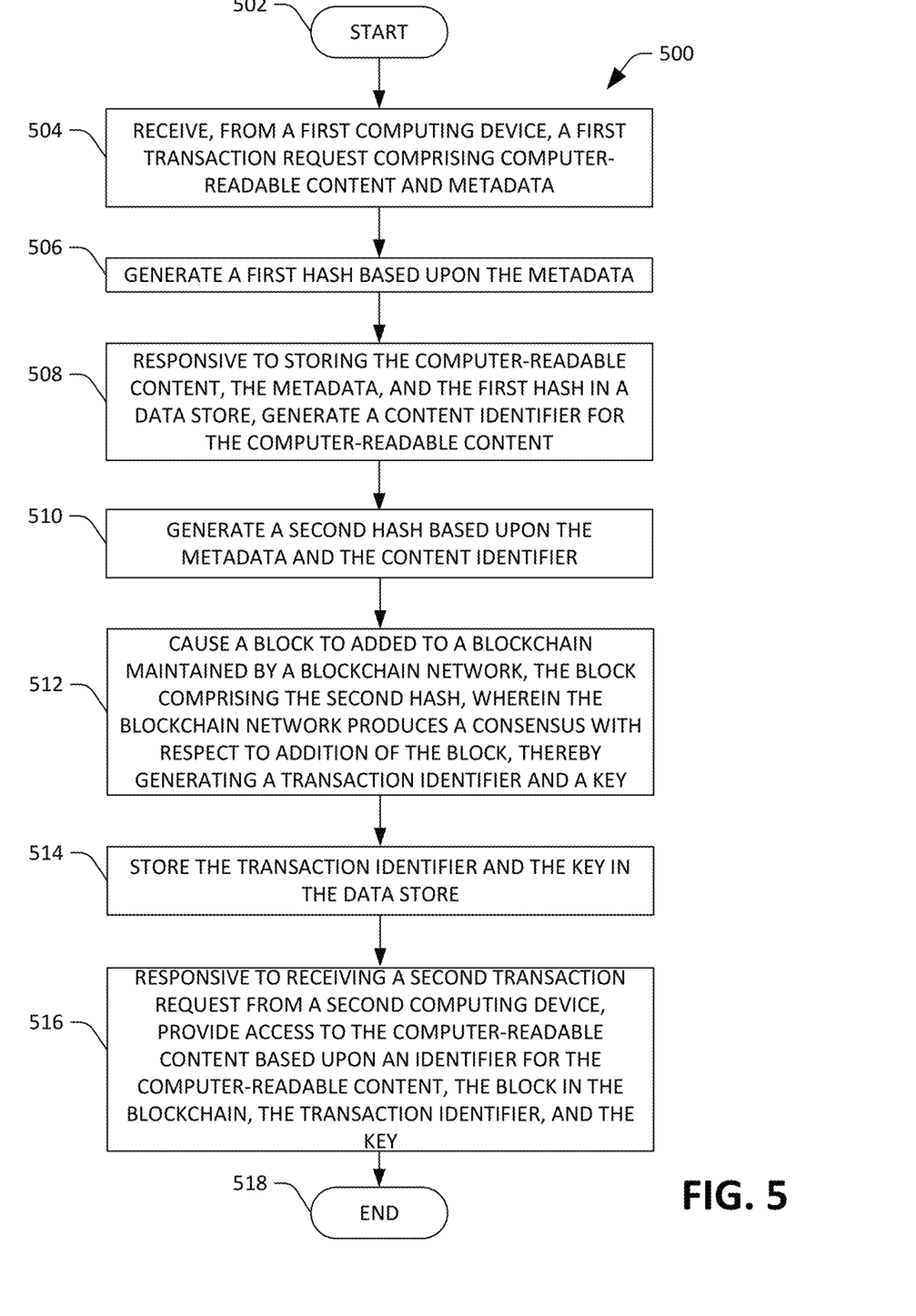
FIG. 5 is a flow diagram that illustrates an exemplary methodology executed by a server computing device for adding and providing access to computer-readable content referenced in a blockchain network.
Figure 6:
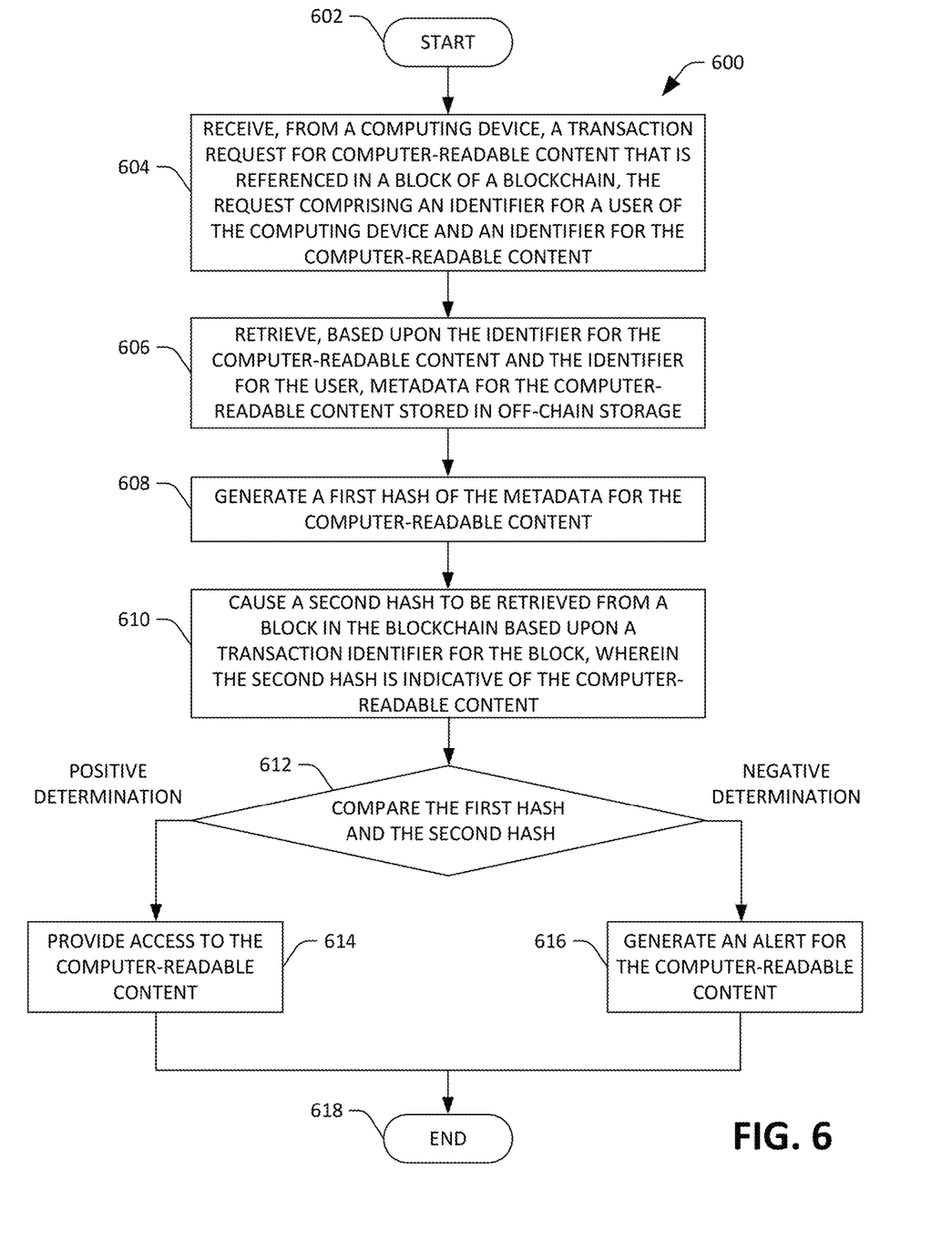
FIG. 6 is a flow diagram that illustrates an exemplary methodology executed by a server computing device for accessing computer-readable content referenced in a blockchain network.

FIGS. 5 and 6 illustrate exemplary methodologies relating to off-chain blockchain storage. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 executed by a server computing device that facilitates adding and providing access to computer-readable content referenced in a blockchain network is illustrated. The methodology 500 begins at 502, and at 504, the server computing device receives a first transaction request from a first computing device of a first enterprise. The first transaction request comprises computer-readable content and metadata for the computer-readable content. At 506, the server computing device generates a first hash based upon the metadata for the computer-readable content. At 508, responsive storing the computer-readable content, the metadata, and the first hash in a data store accessible to the server computing device, the server computing device generates a content identifier for the computer-readable content. At 510, the server computing device generates a second hash based upon the first hash and the content identifier. At 512, the server computing device causes a block to be added to a blockchain that is maintained by a plurality of computing devices in a blockchain network. The plurality of computing devices achieves a consensus with respect to addition of the block to the blockchain which results in the generation of a transaction identifier and a key. The block comprises the second hash. At 514, the server computing device stores transaction identifier and the key in the data store in association with the computer-readable content. At 516, responsive to receiving a second transaction request comprising an identifier for the computer-readable content from a second computing device, the server computing device provides the second computing device with access to the computer-readable content based upon the identifier for the computer-readable content, the block in the blockchain, the transaction identifier, and the key. The methodology 500 concludes at 518.

Turning now to FIG. 6, a methodology 600 executed by server computing device that facilitates accessing computer-readable content referenced in a blockchain network is illustrated. The methodology 600 begins at 602, and at 604, the server computing device receives, from a computing device, a transaction request for computer-readable content that is referenced in a block of a blockchain maintained by a plurality of computing devices in a blockchain network. The transaction request comprises an identifier for a user of the computing device that is to access the computer-readable content and an identifier for the computer-readable content. At 606, the server computing device retrieves, based upon the identifier for the computer-readable content and the identifier for the user, metadata for the computer-readable content stored in off-chain storage. At 608, the server computing device generates a first hash of the metadata for the computer-readable content. At 610, the server computing device causes a second hash to be retrieved from a block in a blockchain based upon a transaction identifier for the block that was generated when the block was added to the blockchain. The second hash is indicative of the computer-readable content when the computer-readable content was stored in the off-chain storage. At 612, the server computing device compares the first hash and the second hash to determine if the first hash matches the second hash. At 614, upon positive determination (i.e., the first hash matches the second hash), the server computing device provides the computing device with access to the computer-readable content. At 616, upon negative determination (i.e., the first hash does not match the second hash), the server computing device generates an alert for the computer-readable content that indicates that the computer-readable content has been modified improperly. The methodology 600 concludes at 618.

Figure 7:
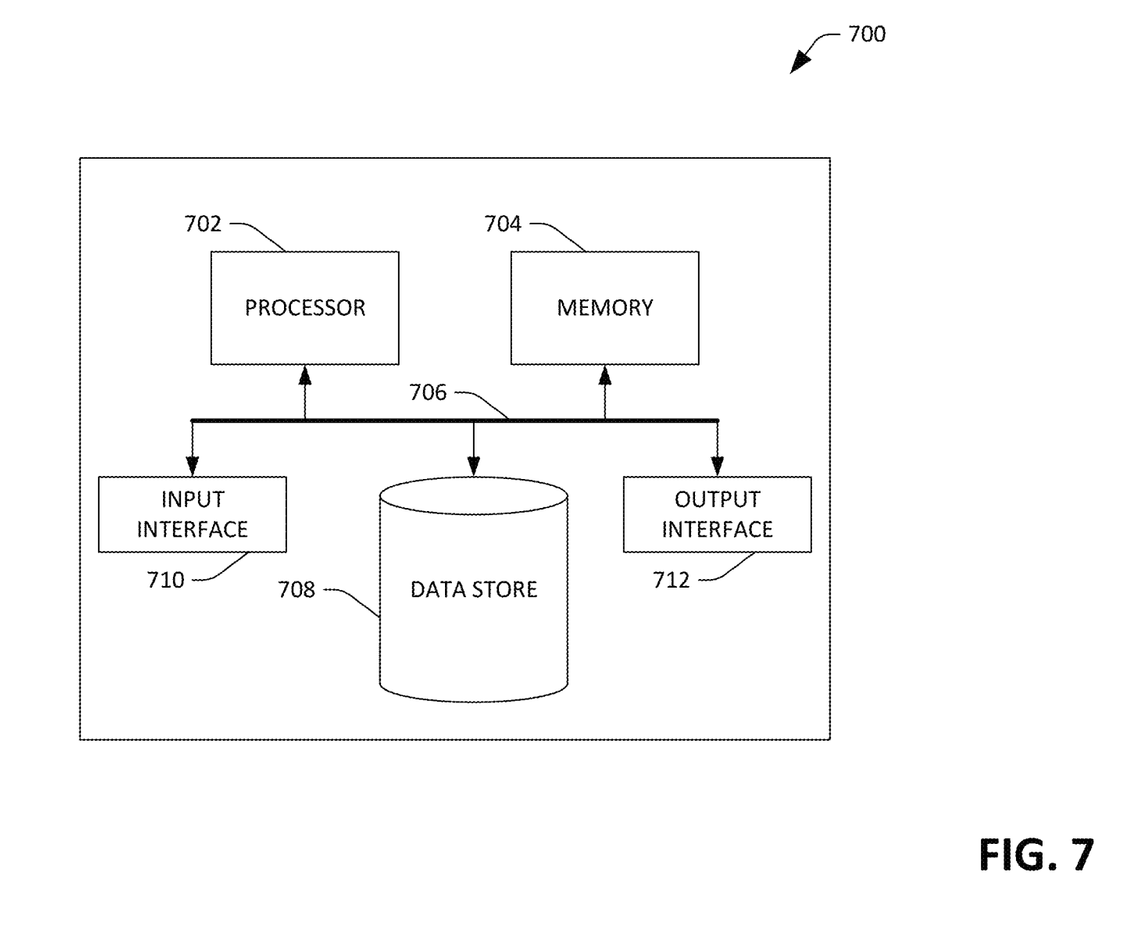
FIG. 7 is a diagram of an exemplary computing device.

Referring now to FIG. 7, a high-level illustration of an exemplary computing device 700 that can be used in accordance with the systems and methodologies disclosed herein is illustrated. For instance, the computing device 700 may be used in a system that facilitates off-chain storage for blockchains. By way of another example, the computing device 700 can be used in a system that facilitates adding, viewing, and modifying computer-readable content referenced in a blockchain. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store blockchains, off-chain content, keys, data models, etc.

The computing device 700 additionally includes a data store 708 that is accessible by the processor 702 by way of the system bus 706. The data store 708 may include executable instructions, blockchains, off-chain content, keys, data models, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Figure 8:
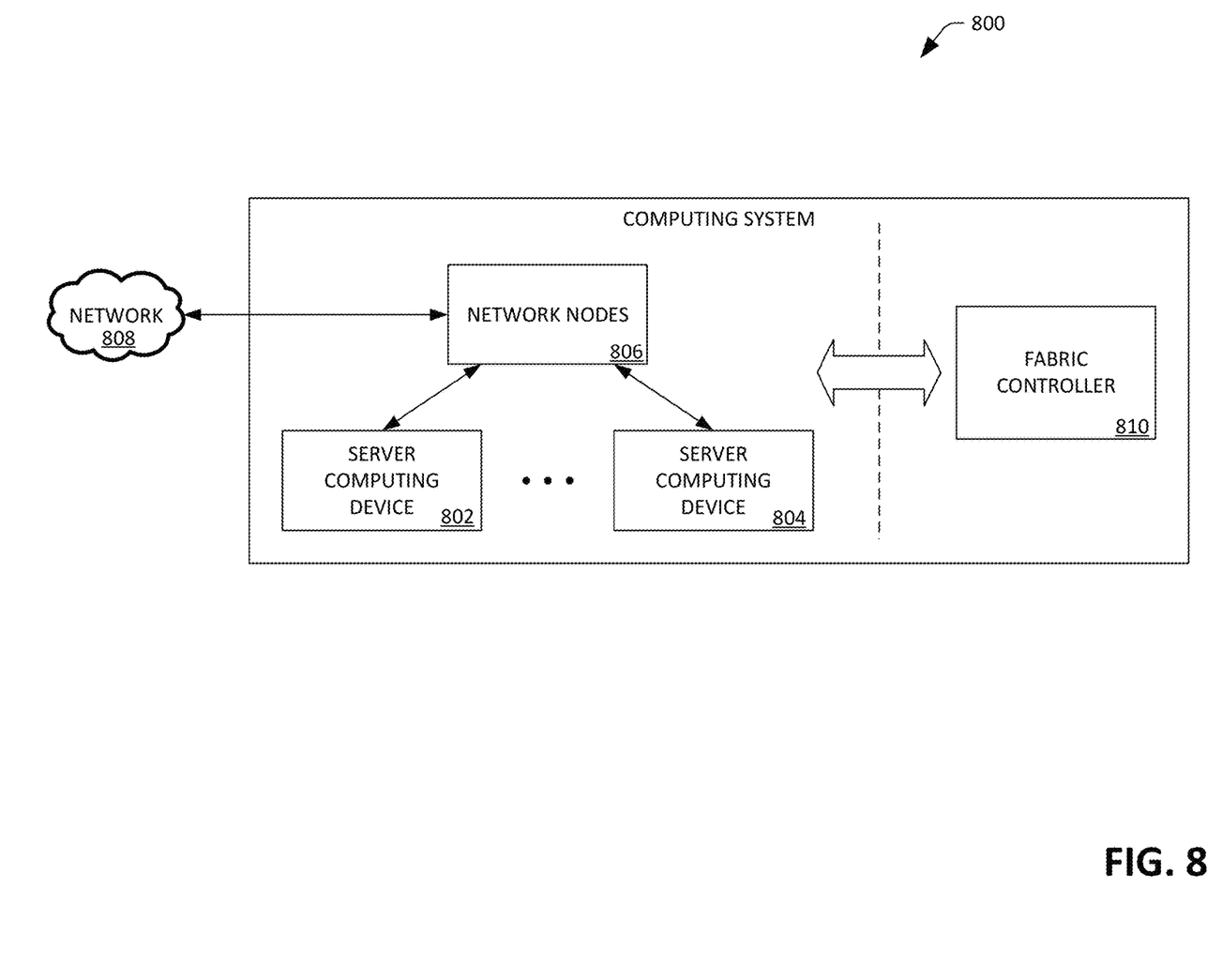
FIG. 8 is a diagram of an exemplary computing system.

Turning to FIG. 8, a high-level illustration of an exemplary computing system 800 that can be used in accordance with the systems and methodologies disclosed herein is illustrated. For instance, the computing system 800 can be or include the server computing device 102, the enterprise server computing device 400, etc. Additionally or alternatively, the server computing device 102 and/or the enterprise server computing device 400 can be or include the computing system 800.

The computing system 800 includes a plurality of server computing devices, namely, a server computing device 802, . . . , and a server computing device 804 (collectively referred to as server computing devices 802-804). The server computing device 802 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 804, at least a subset of the server computing devices 802-804 other than the server computing device 802 each respectively include at least one processor and a memory. Moreover, at least a subset of the server computing devices 802-804 include respective data stores.

Processor(s) of one or more of the server computing devices 802-804 can be or include the processor 104 and/or the processor 402. Further, a memory (or memories) of one or more of the server computing devices 802-804 can be or include the memory 106 and/or the memory 404. Moreover, a data store (or data stores) of one or more of the server computing devices 802-804 can be or include the data store 114 and/or the data store 408.

The computing system 800 further includes various network nodes 806 that transport data between the server computing devices 802-804. Moreover, the network nodes 806 transport data from the server computing devices 802-804 to external nodes (e.g., external to the computing system 800) by way of a network 808. The network nodes 806 also transport data to the server computing devices 802-804 from the external nodes by way of the network 808. The network 808, for example, can be the Internet, a cellular network, or the like. The network nodes 806 include switches, routers, load balancers, and so forth.

A fabric controller 810 of the computing system 800 manages hardware resources of the server computing devices 802-804 (e.g., processors, memories, data stores, etc. of the server computing devices 802-804). The fabric controller 810 further manages the network nodes 806. Moreover, the fabric controller 810 manages creation, provisioning, de-provisioning, and supervising of virtual machines instantiated upon the server computing devices 802-804.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage medium can be any available storage media that can be accessed by a computer. By way of example, and not limitation, such computer-readable storage media can comprise Random-access Memory (RAM), Read-only Memory (ROM), Electrically erasable programmable read only memory (EEPROM), Compact disc read-only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing device, comprising:
   a processor;
   a data store; and
   memory storing instructions that, when executed by the processor, cause the processor to perform acts comprising:
   receiving a first transaction request from a first computing device of a first enterprise, the first transaction request comprising computer-readable content and metadata for the computer-readable content;
   responsive to receiving the first transaction request, generating a first hash based upon the metadata for the computer-readable content;
   responsive to storing the computer-readable content and the metadata for the computer-readable content in the data store, generating a content identifier for the computer-readable content;
   generating a second hash based upon the first hash and the content identifier;
   adding a block to a blockchain maintained by a plurality of computing devices in a blockchain network, the block comprising the second hash, wherein the plurality of computing devices achieves a consensus with respect to addition of the block to the blockchain;
   receiving, from the plurality of computing devices in the blockchain network, a transaction identifier produced responsive to the consensus being achieved;
   storing the transaction identifier in the data store; and
   responsive to receiving a second transaction request comprising an identifier for the computer-readable content from a second computing device of a second enterprise, providing the second computing device with access to the computer-readable content based upon the identifier for the computer-readable content, the block in the blockchain, and the transaction identifier.

2. The server computing device of claim 1, the acts further comprising:
   prior to adding the block to the blockchain, generating a share token, wherein the share token comprises an identifier for a user of the second computing device, wherein the block further comprises a timestamp, the share token, and a hash of a previous block in the blockchain.

3. The server computing device of claim 1, wherein providing the second computing device with access to the computer-readable content comprises:
   retrieving the computer-readable content from the data store based upon the identifier for the computer-readable content and the content identifier;
   generating a test hash of the computer-readable content;
   retrieving the second hash from the blockchain using the transaction identifier; performing a comparison between the test hash and the second hash; and
   providing access to the computer-readable content when the comparison indicates that the test hash and the second hash are identical.

4. The server computing device of claim 3, the acts further comprising:
   generating an alarm when the comparison indicates that the test hash and the second hash are not identical.

5. The server computing device of claim 1, wherein the server computing device is a cloud-based computing platform.

6. The server computing device of claim 1, the acts further comprising:
   prior to receiving the first transaction request, causing an instance of the blockchain to be distributed to each of the plurality of computing devices, thereby generating the blockchain network.

7. The server computing device of claim 1, wherein the first computing device and the second computing device are members of the blockchain network.

8. The server computing device of claim 1, wherein the second computing device is not a member of the blockchain network.

9. The server computing device of claim 1, wherein the computer-readable content comprises: audio content; video content; or image content.

10. The server computing device of claim 1, wherein the blockchain network is a private blockchain network.

11. The server computing device of claim 1, wherein the server computing device is comprised by an enterprise content management system.

12. A method executed by a processor of a server computing device, comprising:
   receiving a first transaction request from a first computing device of a first enterprise, the first transaction request comprising computer-readable content and metadata for the computer-readable content;
   responsive to receiving the first transaction request, generating a first hash based upon the metadata for the computer-readable content;
   responsive to storing the computer-readable content and the metadata for the computer-readable content in a data store accessible to the server computing device, generating a content identifier for the computer-readable content;
   generating a second hash based upon the first hash and the content identifier;

adding a block to a blockchain maintained by a plurality of computing devices in a blockchain network, the block comprising the second hash, wherein the plurality of computing devices achieves a consensus with respect to addition of the block to the blockchain, receiving, from the plurality of computing devices in the blockchain network, a transaction identifier produced responsive to the consensus being achieved;

storing the transaction identifier and a key in the data store; and responsive to receiving a second transaction request comprising an identifier for the computer-readable content from a second computing device of a second enterprise, providing the second computing device with access to the computer-readable content based upon the identifier for the computer-readable content, the block in the blockchain, the transaction identifier, and the key.

13. The method of claim 12, wherein providing the second computing device with access to the computer-readable content comprises:

retrieving the computer-readable content from the data store based upon the identifier for the computer-readable content and the content identifier;

generating a test hash of the computer-readable content;

retrieving the second hash from the blockchain based upon the transaction identifier;

performing a comparison between the test hash and the second hash; and providing access to the computer-readable content when the comparison indicates that the test hash and the second hash are identical.

14. The method of claim 12, further comprising:

receiving a third transaction request from the second computing device of the second enterprise, the third transaction request comprising modified computer-readable content and modified metadata for the modified computer-readable content;

responsive to receiving the third transaction request, generating a third hash based upon the modified metadata for the modified computer-readable content;

responsive to storing the modified computer-readable content and the modified metadata for the modified computer-readable content in the data store, generating a modified content identifier for the computer-readable content;

generating a fourth hash based upon the third hash and the modified content identifier;

adding a second block to the blockchain, the second block comprising the fourth hash, wherein the plurality of computing devices achieves a second consensus with respect to addition of the second block to the blockchain;

receiving, from the plurality of computing devices in the blockchain network, a second transaction identifier and a second key produced responsive to the second consensus being achieved; and storing the second transaction identifier and the second key in the data store.

15. The method of claim 12, further comprising:

generating, by the first computing device, the computer-readable content and the metadata for the computer-readable content, validating, by an enterprise server computing device of the first enterprise, the computer-readable content and the metadata for the computer-readable content, and transmitting, by the first computing device, the computer-readable content and the metadata to the server computing device responsive to the enterprise server computing device validating the computer-readable content and the metadata.

16. The method of claim 12, further comprising:

generating a plurality of copies of the computer-readable content; and causing the plurality of copies of the computer-readable content to be stored in a plurality of data stores.

17. The method of claim 12, further comprising:

prior to receiving the computer-readable content and the metadata for the computer-readable content, receiving user credentials for a user of the first computing device;

responsive to authenticating the user based upon the user credentials, generating a token; and transmitting the token to the first computing device, wherein the first computing device utilizes the token to access the blockchain.

18. The method of claim 12, wherein the computer-readable content is encrypted using the key, wherein the computer-readable content is decrypted using the key when the second computing device is provided with access to the computer-readable content.

19. A computer-readable storage medium comprising instructions that, when executed by a processor of a server computing device, cause the processor to perform acts comprising:

receiving a first transaction request from a first computing device of a first enterprise, the first transaction request comprising computer-readable content and metadata for the computer-readable content;

responsive to receiving the first transaction request, generating a first hash based upon the metadata for the computer-readable content;

responsive to storing the computer-readable content and the metadata for the computer-readable content in a data store, generating a content identifier for the computer-readable content;

generating a second hash based upon the first hash and the content identifier;

adding a block to a blockchain maintained by a plurality of computing devices in a blockchain network, the block comprising the second hash, wherein the plurality of computing devices achieves a consensus with respect to addition of the block to the blockchain;

receiving, from the plurality of computing devices in the blockchain network, a transaction identifier produced responsive to the consensus being achieved;

storing the transaction identifier in the data store; and responsive to receiving a second transaction request comprising an identifier for the computer-readable content from a second computing device, providing the second computing device with access to the computer-readable content based upon the identifier for the computer-readable content, the block in the blockchain, and the transaction identifier.

20. The computer-readable storage medium of claim 19, wherein the first computing device and the second computing device each maintain an instance of the blockchain.

\* \* \* \* \*